June 22, 1943. C. C. SHEPPARD 2,322,395
MIRROR MOUNTING
Original Filed March 20, 1941
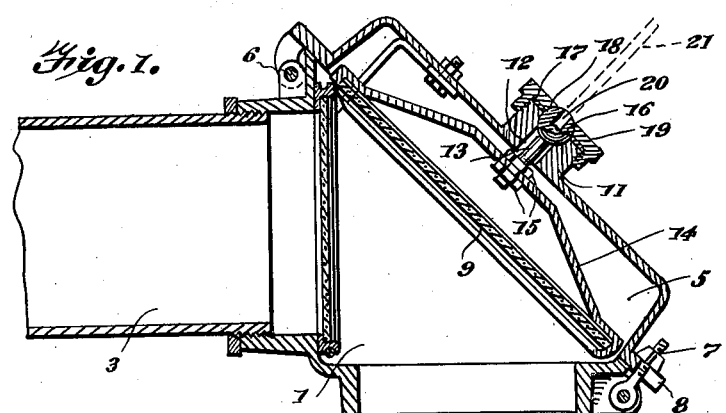
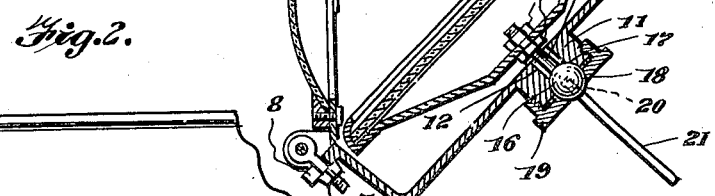
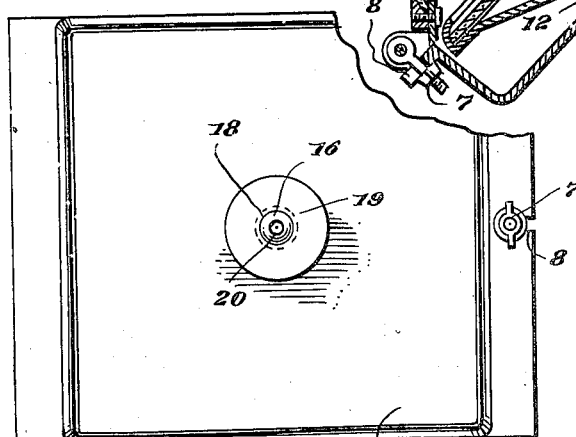
Inventor
CREEDY C. SHEPPARD
By
Attorney Patented June 22, 1943

2,322,395

UNITED STATES PATENT OFFICE 2,322,395

MIRROR MOUNTING

Creedy C. Sheppard, Fort Lee, N. J.

Original application March 20, 1941, Serial No. 384,417. Divided and this application June 25, 1942, Serial No. 448,455

3 Claims. (Cl. 88—97)

This invention relates to a mirror mounting and constitutes a division from the subject matter of my prior application for patent for Smoke detector, filed Mar. 20, 1941, Serial No. 384,417 and issued June 30, 1942, as Letters Patent No. 2,288,143.

It is one object of the invention to provide improved means for mounting a mirror in a reflector box and permitting angular adjustment of the mirror in any direction necessary to bring it into proper angular relation to another mirror.

Another object of the invention is to provide a mirror mounting of such construction that the mirror may be angularly adjusted while the cover carrying the mirror is in a closed position and thus make it unnecessary to release the cover and move it to an opened position with consequent likelihood of escape of gases or the like from a reflector box in which the mirror is mounted.

Another object of the invention is to so form the mirror mounting that an adjusting rod or equivalent implement may be engaged with an exposed portion of a spherical member forming part of the mounting and the mirror easily and accurately adjusted, a cap nut being then tightened to firmly hold the mirror in a set position.

It is another object of the invention to provide a mirror mounting which is simple in construction, easy to adjust, and not liable to slip out of an adjusted position when the securing nut is tightened.

While it has been stated that the improved mounting is for a mirror and it has been illustrated in connection with the mirrors of a smoke detector, it is to be understood that this only illustrates one practical application of the invention and that it may be used for adjustably mounting other articles which are to be mounted for angular adjustment when in use.

In the accompanying drawing:

Figure 1 is a sectional view showing mirrors of a smoke detector mounted for angular adjustment in accordance with the invention.

Figure 2 is a view looking at the outer face of a reflector box cover to which a mirror is mounted in accordance with the invention.

In the accompanying drawing, the numeral 1 indicates a reflector box mounted between the upper end of a vertically disposed tube 2 and an end of a horizontally disposed tube 3. A second reflector box or vision head 4 is mounted at the lower end of tube 2 and each box has an open side normally closed by a cover 5 hinged, as shown at 6, for swinging movement into and out of closed position, where it is releasably secured by a bolt or equivalent fastener 7 carried by the box in position for engagement through a slot 8 formed in the cover. Mirrors 9 are mounted in the boxes or casings 1 and 4, diagonally thereof, and it is necessary to set these mirrors in such angular position or relation to each other that when a person looks into the box or vision head 4 through the vision glass 10, a clear view may be had of smoke or the like passing through a chimney or flue from which the tube 3 extends.

The covers 5 are of cup-shaped formation and each carries an outwardly projecting neck 11 located centrally of the cover and formed with a bore or central passage 12 through which passes a stem 13 carried by the frame 14 of the mirror 9. The inner end portion of the stem 13 is secured through an opening in the mirror frame by nuts 15 and, at its outer end, the stem carries a spherical head or ball 16 which rests in the hemispherical seat or socket 17 at the outer end of the bore 12. The ball or head protrudes from the socket 17 and its outer portion is received in a hemispherical seat or socket 18 formed through the central portion of a cap 19 screwed upon the outer end of the neck 11 and, when the cap is tightened, the ball will be held stationary with the mirror at a predetermined angle. Since the thickness of the stem 13 is appreciably less than the diameter of the bore 12, the mirror and its stem may be tilted in all directions and universal angular adjustment of the mirror obtained by loosening the cap nut 19 and then turning the ball to tilt the stem and the mirror in a desired direction. A portion of the ball is exposed through the constricted outer end of the socket 17, and this portion of the ball protrudes from the cap and is formed with a socket 20 to receive an adjusting rod 21. The socket 20 is formed radially of the ball directly opposite the stem 13 and, therefore, when the adjusting rod or equivalent implement 21 is thrust into the socket, it will be in alinement with the stem. By so forming and mounting the stem, a person looking into the box or vision head through the glass 10, may fit an end of the rod into the socket 20 and turn the ball to tilt the stem in any direction and thus angularly adjust the mirror without opening the cover. Therefore, the adjustment may be made while the cover is closed and accurately adjust the mirror while it is in the position which it will occupy while the apparatus of which the mirror forms an element, is in use. After the adjustment has been made, the cap nut 19 is tightened and pressure will be exerted upon the ball to firmly hold the mirror in a set position.

As previously stated, it is to be understood that while the invention is particularly adapted for mounting mirrors in a smoke detector, it is not limited to this particular use and may be used for mounting other articles for universal tilting movement or adjustment.

Having thus described the invention, what is claimed is:

1. In a device of the character described, a mounting member having a neck extending therefrom and formed with a bore and a hemispherical socket at the outer end of the bore, a cap nut screwed on the outer end of said neck and formed with a hemispherical socket registering with the socket of the neck and for a portion of its diameter exposed through the outer face of the cap nut, a mirror having a frame formed with an opening at its center, a stem having a threaded inner end portion passing through the opening of said frame, nuts on the stem gripping inner and outer face of the frame to firmly mount the stem axially of the mirror, said stem passing through the bore of the neck and having a spherical head at its outer end received in sockets of the neck and the cap nut to mount the stem for universal tilting adjustment of the mirror, and the head having a portion exposed through the constricted outer portion of the socket of the cap nut and formed with a socket extending in longitudinal alinement with the stem for removably receiving an adjusting implement during tilting adjustment of the mirror.

2. In a device of the character described, a mounting member having a neck extending therefrom and formed with a bore and a hemispherical socket at the outer end of the bore, a mirror having a frame, a stem extending from the frame centrally of the mirror and through the bore of the neck, a spherical head at the outer end of said stem seated in the socket, the stem being of a thickness appreciably less than the diameter of the bore to permit universal tilting adjustment of the mirror, and a cap nut screwed upon the outer end portion of said neck and formed with a hemispherical socket receiving the spherical head and extending through the nut to expose a portion of the head, the exposed portion of the head being formed with a socket opposite the stem to receive an adjusting implement, and the nut when tightened gripping the head to hold the stem and mirror in an angularly adjusted position.

3. In a device of the character described, a mounting member having a rearwardly extending neck formed with a bore having a spherical socket at its rear end, an article in front of said mounting member having a stem extending rearwardly therefrom through the bore of the neck and provided at its rear end with a spherical head seated in said socket to mount the stem and the article for universal tilting adjustment, and a clamping member screwed upon the rear end portion of the neck and formed with a socket receiving the head and for a portion of its diameter being open at its rear end, a portion of the head being exposed through the open rear end of the socket of the clamping member; means for adjusting said article comprising a socket in the exposed portion of the spherical head adapted to removably receive an adjusting implement whereby the stem and the article may be tilted to an angularly adjusted position in which it is held when the clamping member is tightened.

CREEDY C. SHEPPARD.